(12) United States Patent
Groneberg-Nienstedt

(10) Patent No.: US 9,192,173 B2
(45) Date of Patent: *Nov. 24, 2015

(54) METHOD OF MAKING INDIVIDUAL PORTIONS OF MEAT

(75) Inventor: Petra Groneberg-Nienstedt, Haltern (DE)

(73) Assignee: Nienstedt GmbH, Haltern (DE)

( * ) Notice: Subject to any disclaimer, the term of this patent is extended or adjusted under 35 U.S.C. 154(b) by 97 days.

This patent is subject to a terminal disclaimer.

(21) Appl. No.: 11/886,809

(22) PCT Filed: Feb. 4, 2006

(86) PCT No.: PCT/EP2006/000987
§ 371 (c)(1),
(2), (4) Date: Sep. 19, 2007

(87) PCT Pub. No.: WO2006/105821
PCT Pub. Date: Oct. 12, 2006

(65) Prior Publication Data
US 2009/0029027 A1    Jan. 29, 2009

(30) Foreign Application Priority Data

Apr. 7, 2005 (DE) .......................... 10 2005 016 159

(51) Int. Cl.
*A23B 4/00* (2006.01)
*A22C 17/00* (2006.01)
*A22C 25/18* (2006.01)

(52) U.S. Cl.
CPC ............... *A22C 17/002* (2013.01); *A22C 25/18* (2013.01)

(58) Field of Classification Search
CPC ........... A23P 1/08; A23P 1/085; A23P 1/082; A23P 1/10; A23P 1/105; A23P 1/00; A23L 1/31

USPC ......... 426/513, 389, 641, 281, 413, 518, 512, 426/524, 644, 645, 643; 425/298, 572, 297, 425/289, 306; 452/174

See application file for complete search history.

(56) References Cited

U.S. PATENT DOCUMENTS

| 113,422 | A | | 4/1871 | Graham |
|---|---|---|---|---|
| 1,864,285 | A | | 6/1932 | Taylor |
| 3,644,125 | A | | 2/1972 | Lobiondo |
| 3,709,699 | A | * | 1/1973 | Hartman et al. ............... 426/541 |
| 4,055,892 | A | * | 11/1977 | Del Vecchio .................... 30/303 |
| 4,142,011 | A | * | 2/1979 | Gierek et al. .................. 427/431 |
| 4,474,823 | A | | 10/1984 | Nishikawa |
| 6,406,284 | B1 | | 6/2002 | Whitehouse .................... 425/90 |
| 2003/0113422 | A1 | * | 6/2003 | Groneberg-Nienstedt et al. ............................ 426/513 |

FOREIGN PATENT DOCUMENTS

| DE | 2053459 | 10/1970 |
|---|---|---|
| DE | 2 235 517 | 1/1973 |
| DE | 10164637 | 12/2001 |
| EP | 0101264 | 8/1983 |
| EP | 1319343 | 10/2002 |
| EP | 1470754 | 4/2003 |
| EP | 1 470 754 | 10/2004 |
| GB | 413 265 | 10/1932 |
| GB | 2121269 | 5/1982 |
| GB | 2 280 869 | 2/1995 |

* cited by examiner

*Primary Examiner* — Preston Smith
(74) *Attorney, Agent, or Firm* — Panitch Schwarze Belisario & Nadel LLP

(57) ABSTRACT

The invention relates to a method for producing individual portions of meat with a predetermined shape and size, during which one, two or more frozen pieces of meat of any shape, whose total weight corresponds to the total weight of the desired portions of meat, are shaped inside the cavity of a press mold to form a coherent piece of meat, and the frozen piece of meat is subsequently divided, in particular, stamped into the portions of meat.

8 Claims, No Drawings

METHOD OF MAKING INDIVIDUAL PORTIONS OF MEAT

CROSS REFERENCE TO RELATED APPLICATIONS

This application is the U.S. national phase of PCT application PCT/EP2006/000987, filed 4 Feb. 2006, published 12 Oct. 2006 as WO2006/105821, and claiming the priority of German patent application 102005016159.6 itself filed 7 Apr. 2005, whose entire disclosures are herewith incorporated by reference.

FIELD OF THE INVENTION

The invention relates to a method for producing individual portions of meat, each with a certain shape, size and in particular a certain weight.

BACKGROUND OF THE INVENTION

It is known from EP-A-1 319 343 [US 2003/0113422] to trim an individual frozen piece of meat until it has a desired weight and preliminary shape in order to then press it into its final shape in a mold in the frozen state. Due to the trimming, this method results in scraps which are used for other purposes. In addition, it is known from EP-A-1 470 754 to place a piece of meat with a larger weight than that of the final product between upper and lower pressing tools, to always position the two tools at the same distance and to stamp the desired meat portion from the resulting layer. Here, scraps are created as well.

OBJECT OF THE INVENTION

It is the object of the invention to improve on a method of the kind mentioned above such that, with little technical effort and low stress on the meat pieces, meat portions with pre-defined shapes and sizes are produced, which do not lead to the creation of additional scraps.

SUMMARY OF THE INVENTION

This object is solved according to the invention in that one, two or more frozen pieces of meat of any shape, with their overall weight equaling the overall weight of the desired meat portions, are molded to a continuous piece of meat inside the cavity of a press mold and that the frozen piece of meat is afterward separated, particularly stamped into the desired meat portions.

Through this method, meat portions of predefined weight and shape are created in an economical manner without resulting in scraps and/or waste. Only minor stress is placed on the meat and/or the fibers and, by means of simple technical resources, a high amount of work cycles is achieved.

It is particularly advantageous that the edge of the mold cavity corresponds to the external marginal sections of the meat portions, so that the trimming of meat portions extending beyond the cavity does not occur.

Preferably it is proposed that the meat pieces are molded into one meat piece by means of a stamp inside the press mold. Here, for the shaping of the meat piece surface, the pressing surface of the stamp may have a nonplanar shape.

It is particularly advantageous that the meat piece is separated into the meat portions by a stamping tool. The meat portions may also be shaped during the stamping process.

A predefined shape of the meat portion's lower side is achieved if the cavity floor has a nonplanar shape. It is particularly advantageous if separation, in particular stamping of the meat piece into meat portions, occurs inside the press mold or inside a stamping cavity outside the press mold.

It is particularly possible that, by means of the method according to the invention, the meat piece or meat pieces is or are partially covered by skin. It is of advantage if the meat pieces have a temperature of −5° C. to −20° C. when inserted into the mold.

It is preferably proposed that the meat is either poultry, beef, pork, lamb or fish. Prior to pressing and/or trimming, the pieces of meat may be pretreated in tumblers and/or marinated in sauces, marinades or spices or by means of injection.

Advantageous embodiments of the method according to the is invention are described in more detail hereinafter.

One or more frozen pieces of meat of different sizes, shapes and weights are placed in the cavity of a press mold having a predefined floor surface. The floor surface results from the shape, size and weight of the subsequently desired meat portions. The floor surface may be flat or may comprise bulges according to the desired shapes of the resulting meat portions.

The cavity comprises an outer rim projecting upward, into which a complementarily shaped stamp is pressed from above in order to press the piece or pieces of meat in the cavity to such an extent that it or they fill the cavity completely, and hence the entire floor of the cavity. The projecting outer rim of the cavity, as well as the exactly predefined or premeasured amount of the meat piece or pieces, ensure that due to the pressing process inside the cavity a continuous piece of meat is created from the meat piece or pieces, having an exactly predefined shape, size and weight. Consequently, due to prior exact weighing of the meat piece or pieces the meat portion created by means of pressing inside the cavity always has the same size, shape and the same weight. Therefore, the thickness of this piece of meat always equals the desired thickness.

The stamp may be flat on the bottom or may have a certain defined surface shape according to the desired shape of the meat piece surface.

After removal of the stamp, the deep-frozen piece of meat created in this way is then separated, particularly stamped into individual meat portions of pre-defined shape and size inside the mold. For this purpose, the piece of meat is placed underneath a stamping tool. Deformation may be repeated during stamping.

With this method, meat portions do not extend out of the cavity, thus the creation of scraps does not occur. Also, it is not necessary to trim the pieces of meat that are inserted into the mold at the beginning of the operation.

The meat of the meat pieces may particularly be poultry, beef, pork, lamb or fish and may also be partially covered by skin. Preferably, the pieces of meat have a temperature of −5° C. to −20° C. when treated. Prior to pressing and/or trimming, the meat pieces may be pretreated in tumblers and/or marinated in sauces, marinades or spices, or by means of injection.

The invention claimed is:

1. A method of making sets of individual portions of meat, wherein each set of individual portions of meat has a predetermined total weight and each individual portion of meat has a predetermined shape and weight, the method comprising:
 preparing a deep-frozen mass of meat having an overall weight equal to the predetermined total weight and comprising at least one piece of meat;
 loading the deep-frozen mass of meat into a mold having a cavity formed by an upstanding outer rim and a flat or nonplanar floor surface corresponding to desired shapes of the individual portions to be made;

pressing a first stamp having a shape that is complementary to a shape of the cavity down into the cavity inward of the upwardly projecting outer rim and deforming the deep-frozen mass of meat into a continuous mass of deep-frozen meat covering and conforming to the floor of the mold, having an exactly defined shape, size, and weight and filling the entire cavity within the rim;

removing the first stamp from the mold; and applying a second stamp to the continuous mass of deep-frozen meat to separate the continuous mass of deep-frozen meat into the individual meat portions of predetermined shape and weight in the mold.

2. The method defined in claim 1, wherein the rim of the cavity corresponds to outer marginal sections of the individual meat portions.

3. The method defined in claim 1, wherein a pressing surface of the first stamp has a nonplanar shape.

4. The method defined in claim 1, wherein the individual meat portions are deformed during the applying the second stamp.

5. The method defined in claim 1, wherein the at least one deep-frozen piece of meat piece is partially covered by skin.

6. The method defined in claim 1, further comprising:

cooling the at least one piece of meat to a temperature of −5° to −20° C. before insertion into the mold.

7. The method defined in claim 1 wherein the meat is poultry, beef, pork, lamb or fish.

8. The method defined in claim 1, further comprising:

pretreating the at least one piece of meat in tumblers or by marinating in sauces, marinades or spices, or by means of injection prior to pressing.

* * * * *